Oct. 20, 1953

C. C. STEVENS 2,656,124

COIL WINDING MACHINE

Filed Oct. 4, 1949

INVENTOR
C. C. STEVENS
BY
ATTORNEY

Oct. 20, 1953

C. C. STEVENS

2,656,124

COIL WINDING MACHINE

Filed Oct. 4, 1949

INVENTOR
C. C. STEVENS
BY
ATTORNEY

Patented Oct. 20, 1953

2,656,124

UNITED STATES PATENT OFFICE 2,656,124

COIL WINDING MACHINE

Clarence C. Stevens, Forestville, Conn., assignor, by mesne assignments, to Western Electric Company, Incorporated, New York, N. Y., a corporation of New York Application October 4, 1949, Serial No. 119,437

18 Claims. (Cl. 242—4)

1

This invention relates to coil winding machines and more particularly to a machine for winding strands on toroidal cores.

It is an object of the present invention to provide an improved machine for effectively and efficienty winding strands on toroidal cores.

In one embodiment of the invention a split ring-type spool or shuttle is provided for receiving a predetermined length of strand thereon and is driven at a uniform rate from a constant speed motor and serves to unwind the strand from the shuttle and wind it onto a toroidal core supported, by a holder, in a position encircling a portion of the shuttle. The holder is mounted for oscillating movement about an axis substantially tangent with the shuttle and is rotated about this axis in opposite directions by a reversible drive driven from the constant speed motor through a variable speed unit by means of which the rate of rotation of the holder may be varied with respect to the rate of rotation of the shuttle. The reversible drive includes a clutch which has a neutral and two operative positions and is automatically movable from one to the other of the operative positions by a spring loaded shifting mechanism associated with a pair of adjustable trip members movable with the drive mechanism and operable in response to predetermined movement thereof to trip the shifting mechanism and cause a quick reversal of the drive mechanism. A manually actuated cam is provided to render the automatic reversing mechanism temporarily inoperative whereby the machine may be set to start winding the coil in a predetermined starting position.

Other objects and advantages will be apparent by reference to the following detailed description and the accompanying drawings illustrating a preferred embodiment thereof in which.

2

Figure 1:
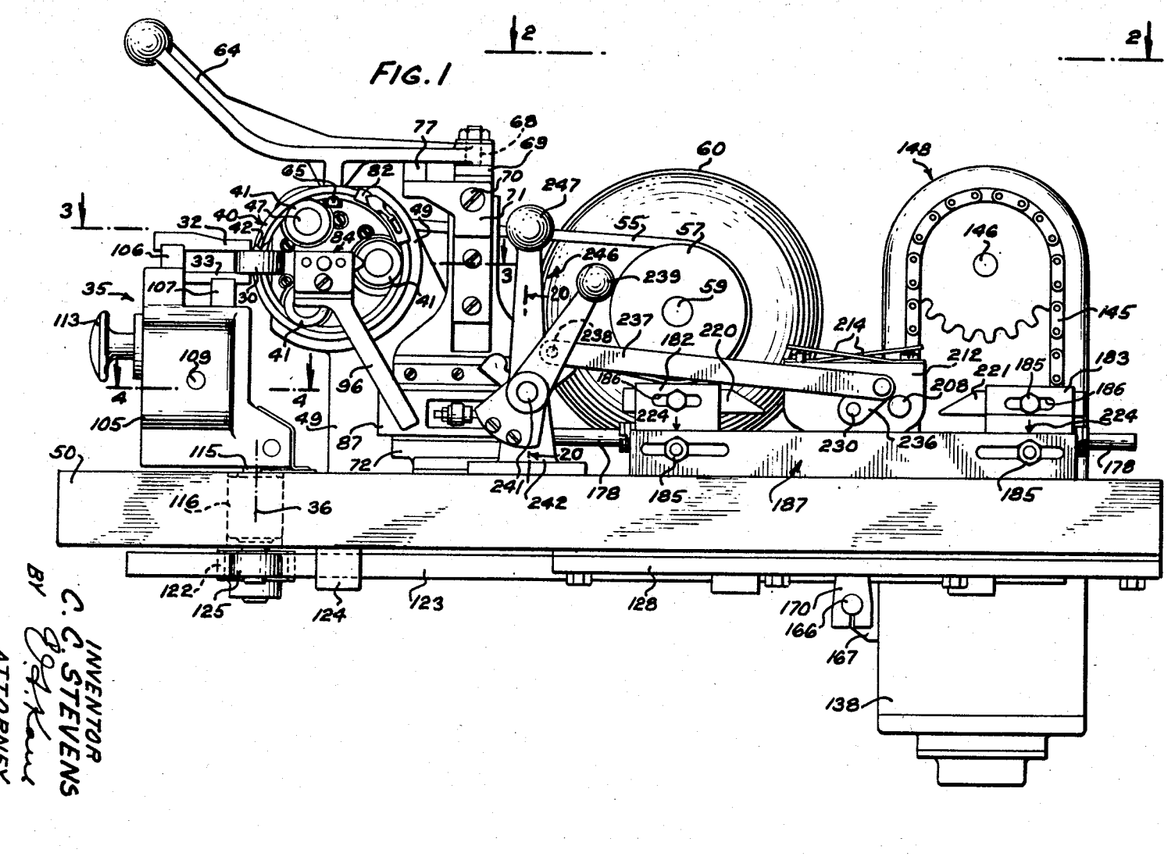
Fig. 1 is a front elevational view of the toroidal coil winding machine.
Figures 3, 4:
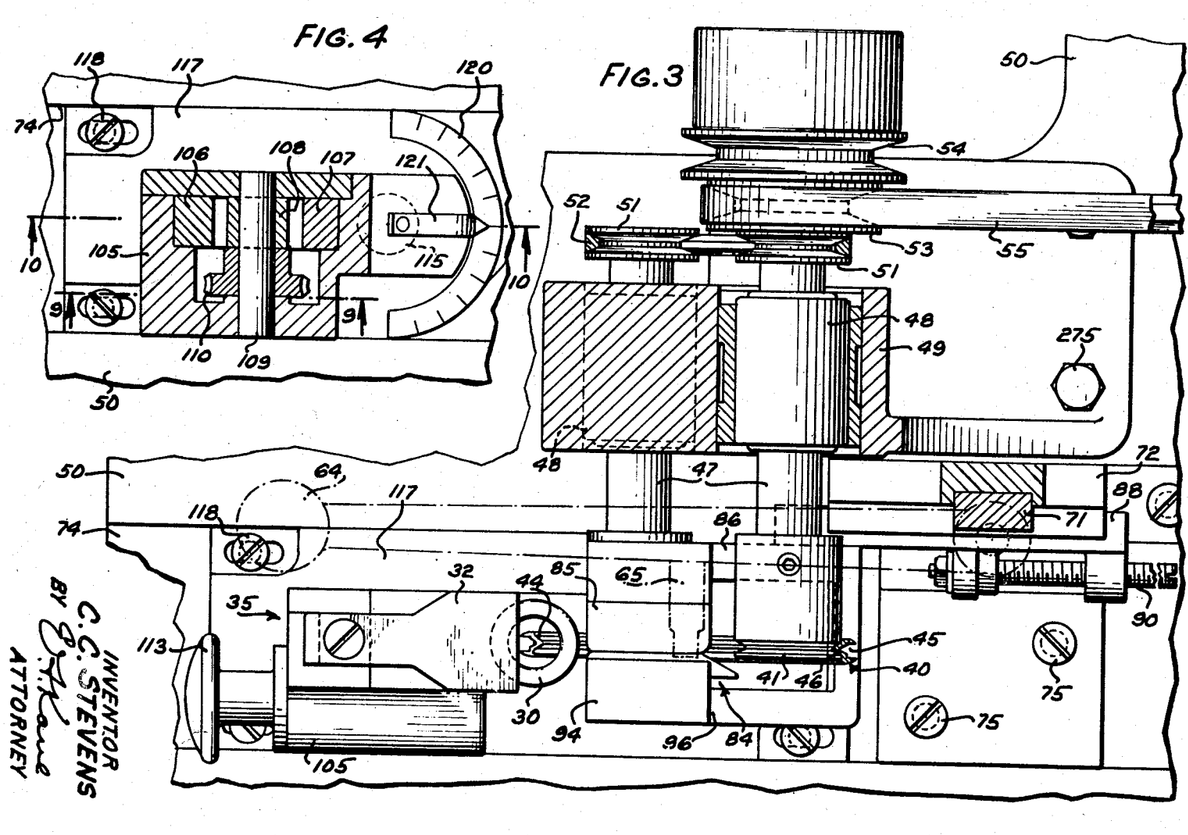
Fig. 3 is an enlarged plan sectional view of a portion of the machine taken through the shuttle and on the line 3—3 of Fig. 1.
Fig. 4 is a fragmentary plan sectional view through the core holder taken on the line 4—4 of Fig. 1.

Referring now to the drawings (Figs. 1 and 3), a toroidal core 30, about which a strand of wire is to be wound to form a coil, is supported between a pair of clamping jaws 32—33 of a core holder 35 which is oscillatable about a vertical axis indicated by the dot and dash line 36 (Fig. 1). The core 30 is adapted to be supported in coaxial relation with the axis 36 for oscillation thereabout and to be interlinked with a split ring-type spool or shuttle 40 rotatably mounted on three driving pulleys 41—41. Formed as a single steel ring, the shuttle 40 is split at 42 (Fig. 5) and has end portions 43 and 44, the extremities of which are formed to nest together and form a separable joint. The shuttle 40 (Fig. 3) is provided with an annular outwardly directed groove 45 for receiving a predetermined length of wire therein and an inwardly extending V-shaped annular rib or rail 46 extending into V-shaped grooves in the driving pulleys 41. The pulleys 41 are mounted on the forward end of shafts 47, which are provided with suitable anti-friction bearings 48, which in turn are mounted in a supporting bracket or head 49 mounted on a base 50. At their rear ends (Fig. 3), the shafts 47 are provided with sheaves 51—51, which are encircled by a belt 52 for driving the shafts 47 and the drive pulleys 41 simultaneously in the same direction. One of the shafts 47 is extended rearwardly and is provided with a pair of stepped pulleys 53—54, over one of which a drive belt 55 is entrained, which belt also engages one of a pair of stepped pulleys 57—58 (Fig. 2) secured to one end of the shaft 59 of a constant speed drive motor 60 secured in fixed position on the base 50. It will thus be seen that the shuttle 40 is frictionally driven at a uniform rate of rotation. When a coil is to be wound from very fine wire, it is desirable to reduce the rate of rotation of the shuttle, which is accomplished by moving the drive belt 55 onto the slow speed pulleys 54 and 58.

Figures 5, 6, 7:
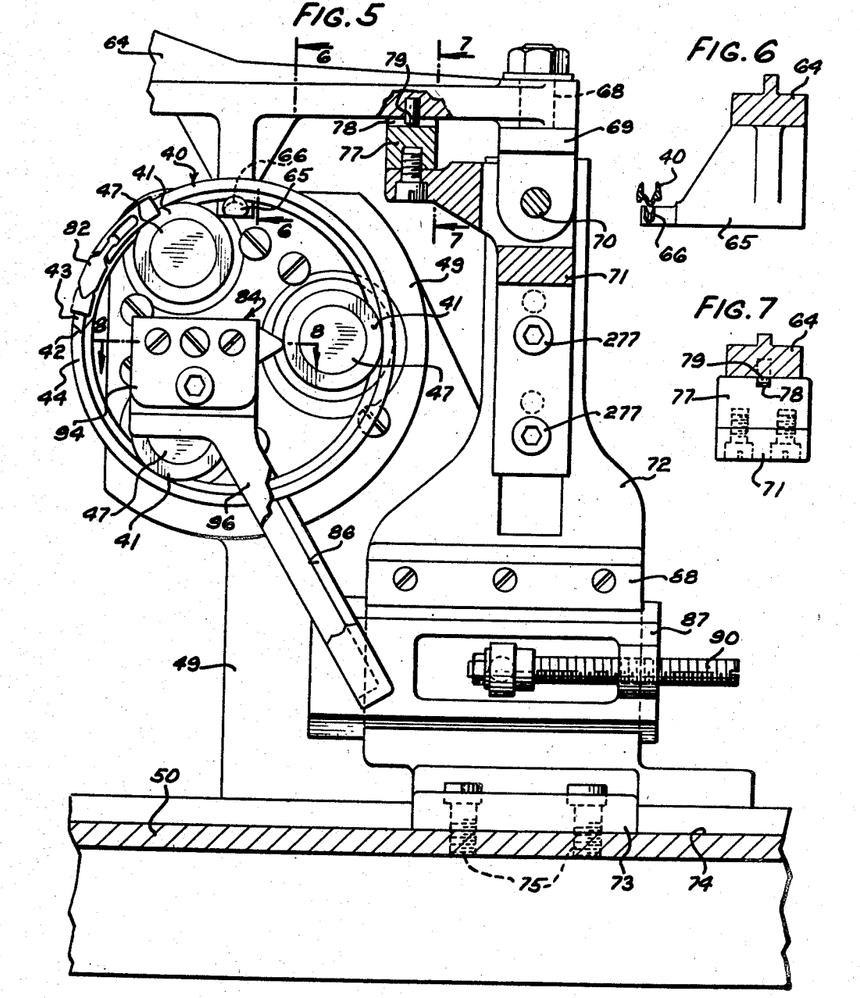
Fig. 5 is a fragmentary vertical sectional view of the machine showing the shuttle and parts associated therewith.
Fig. 6 is a detailed vertical sectional view through the shuttle and the shuttle opening lever taken on the line 6—6 Fig. 5.
Fig. 7 is a detail vertical sectional view taken on the line 7—7 of Fig. 5.
Figure 8:
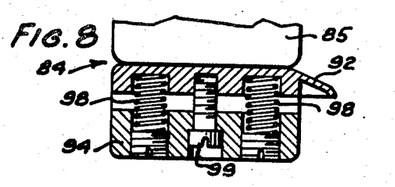
Fig. 8 is a detailed plan sectional view though the strand tensioning device taken on the line 8—8 of Fig. 5.

The shuttle 40 is made of spring steel and as previously stated is split at 42 to provide a separable joint which may be opened by springing or moving the end 43 of the shuttle vertically to separate it from the end 44 and to clear the uppermost drive pulley 41 and then moving it laterally to open position to permit the insertion and the removal of the core and the coils to and from their winding position. To facilitate the springing of the shuttle to its open position, there is provided a lever 64 (Fig. 1) pivotally mounted for vertical and lateral movement and having a downwardly laterally extending arm or connector member 65 (Figs. 5 and 6) provided with a groove 66 for receiving a portion of the shuttle therein and effecting a connection therewith. The lever 64 is mounted for pivotal movement on the upwardly extending shank portion 68 of a block 69 which is pivotally mounted about a horizontal pin 70 secured in the upper bifurcated end of a supporting member 71 adjustably secured to the supporting bracket 72. The supporting bracket 72 has a laterally extending foot 73 engaging in a longitudinally extending guide groove 74 in the base 50 and is secured to the base by cap screws 75 (Fig. 5).

Secured to the upper laterally extending portion of the supporting member 71 is a block 77 engageable with the underneath side of the lever 64 for supporting it in its normal position. The block 77 is provided with a groove 78 adapted to receive a pin 79 extending downwardly from the lever 64, which, in cooperation with the grooved block 77, serves to retain the lever against lateral displacement. In the normal inoperative position of the handle 64, the connector member 65 is spaced from the ring or shuttle 40 with the groove 66 in vertical alignment with the rail 46 of the shuttle. In order to open the shuttle, the lever 64 is moved vertically until the pin 79 is disengaged from the groove 78, which action separates the ends 43 and 44 of the shuttle and disengages a portion thereof from the upper driving pulley 41, after which the handle 64 may be moved laterally to laterally displace the raised end 43 of the ring from the other end 44 thereof. To close the shuttle, the handle 64 is moved in the reverse direction.

The shuttle, the means for mounting and driving the shuttle, and the means for actuating the shuttle to and from open and closed positions, as disclosed in the present application, are also shown and are claimed in the co-pending application of E. W. Redlich, Serial No. 119,503, filed October 4, 1949.

As the strand is unwound from the shuttle 40 and wound onto the core 30, it is guided by a slider 82 (Figs. 1 and 5), slidably mounted on the near flange of the shuttle 40 for rotation on the shuttle in the usual manner. To facilitate the proper winding of the strand onto the core, a tensioning device 84 is provided (Figs. 1, 3, 5 and 8). The tensioning device comprises a stationary guide shoe 85 fixed to the upper end of an arm 86 extending obliquely upwardly from a slide block 87 adjustably mounted in a horizontal slideway 88 formed on supporting bracket 72 and held in adjusted position thereon by means of an adjusting screw 90. Cooperating with the fixed shoe 85 is a movable shoe 92 mounted for transverse movement relative to the shoe 85 in a block 94 fixed to the upper end of an arm 96 extending obliquely upwardly from the slide 87 in spaced relation to the arm 86. The movable shoe 92 is urged against the shoe 85 by springs 98 and is guided for lateral movement by a retaining guide screw 99. The shoes 85 and 92 meet in a plane through which the loops of the strand pass as they are being wound onto the core and serve to yieldably engage and apply a predetermined tension thereto. The forward ends of the shoes are rounded and form divergent guide surfaces for engaging the strand.

Figures 9, 10, 11:
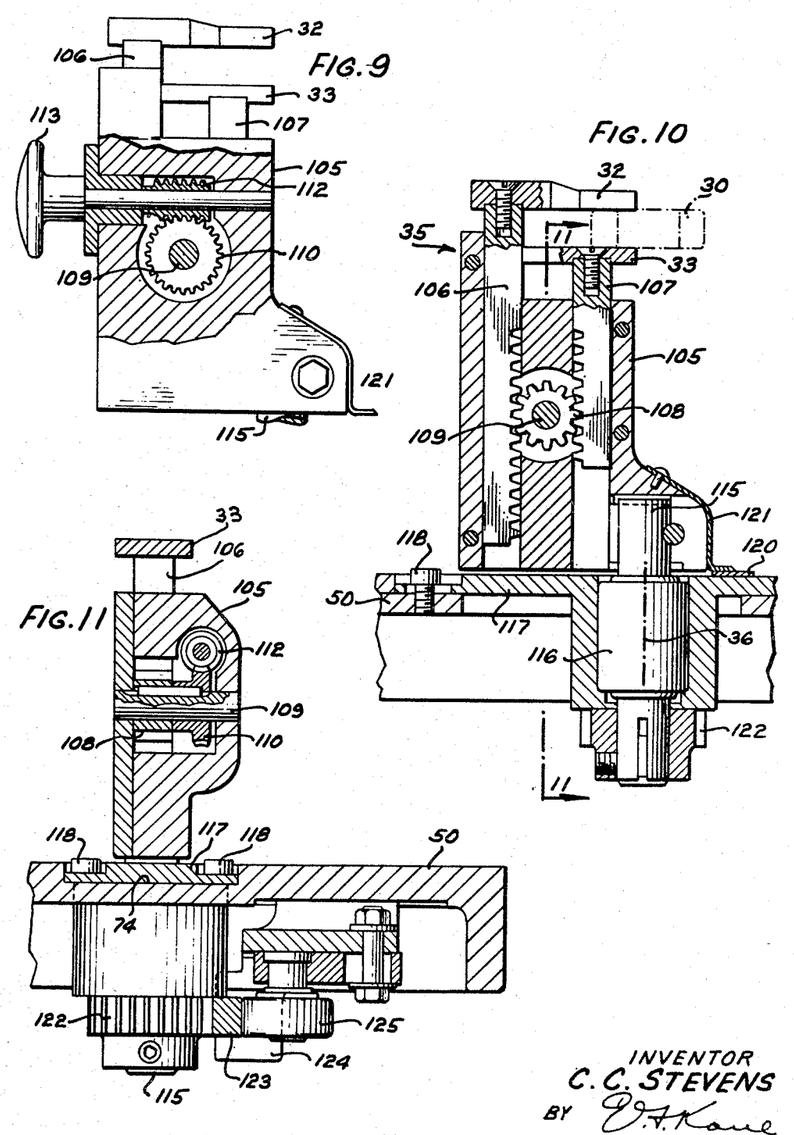
Fig. 9 is a fragmentary vertical sectional view of the core holder taken on the line 9—9 of Fig. 4.
Fig. 10 is a fragmentary vertical sectional view through the core holder taken on the line 10—10 of Fig. 4.
Fig. 11 is a vertical sectional view taken on the line 11—11 of Fig. 10.

The core holder 35 (Figs. 1, 3, 4, 9, 10 and 11) comprises a column or housing 105 having a pair of spaced vertical guideways for receiving the rack bars or posts 106 and 107 (Fig. 10), to the upper ends of which are secured the clamping jaws 32 and 33, respectively. The gear teeth formed on the inner faces of the rack bars 106 and 107 mesh with a spur gear 108 fixed to a shaft 109. A worm gear 110, also fixed to the shaft 109, meshes with a worm 112 operatively connected to a handle 113 whereby, upon rotation of the handle 113, the clamping jaws 32 and 33 may be actuated to clamp or release a core 30. The column 105 (Figs. 10 and 11) is secured at its lower end to a vertical shaft 115 which is provided with an anti-friction bearing 116 and is mounted in a bracket 117 which in turn is adjustably secured to the base 50 by cap screws 118. The core holder 35, as mentioned above, is adapted to oscillate about the axis 36 of the shaft 115, and the core 30 is adapted to be clamped in the holder in coaxial alignment with the axis 36. A stationary scale 120 (Figs. 4 and 10) is fixed to the bracket 117, and a pointer 121 is secured to the column 105 to cooperate with the scale 120 and indicate the extent of angular oscillation of the holder 35.

A gear 122 is fixed to the lower end of the shaft 115 and meshes with gearing of a suitable reversible drive mechanism, by means of which the holder 35 is oscillated.

Figure 2:
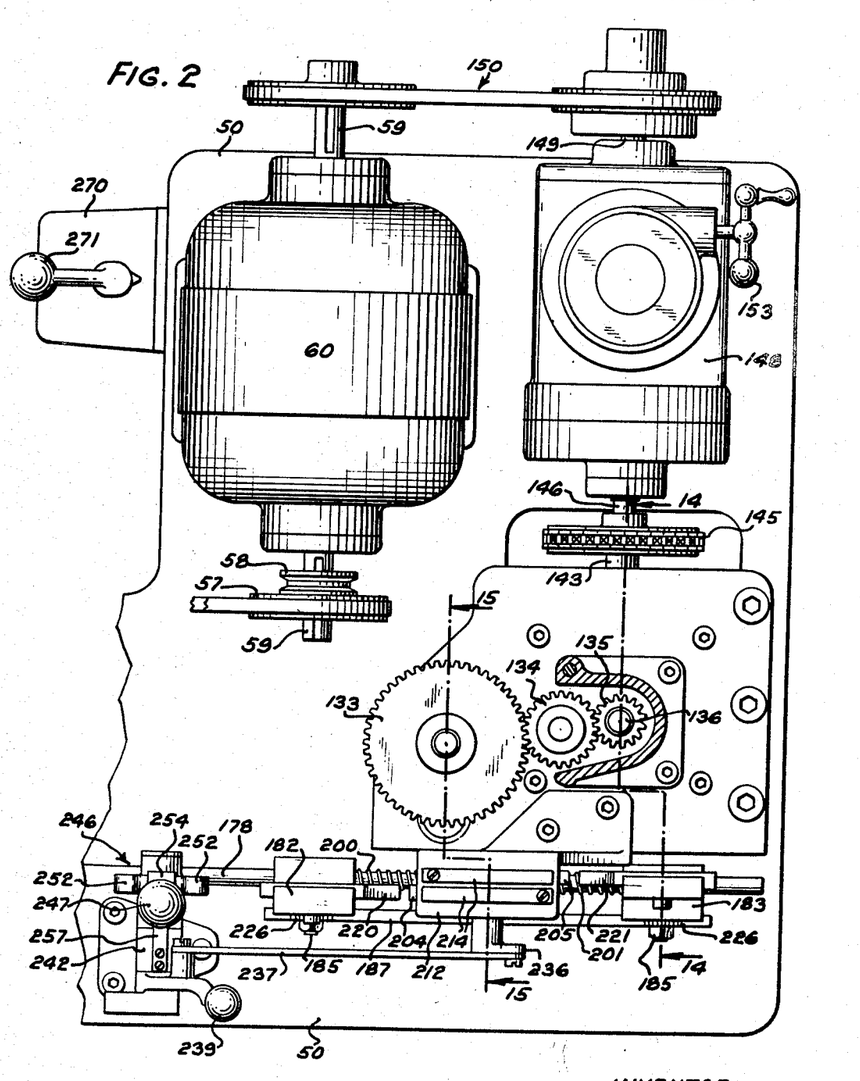
Fig. 2 is a plan view of a portion of the machine with parts shown in section looking in the direction of the arrows on the line 2—2 of Fig. 1.
Figures 12, 13:
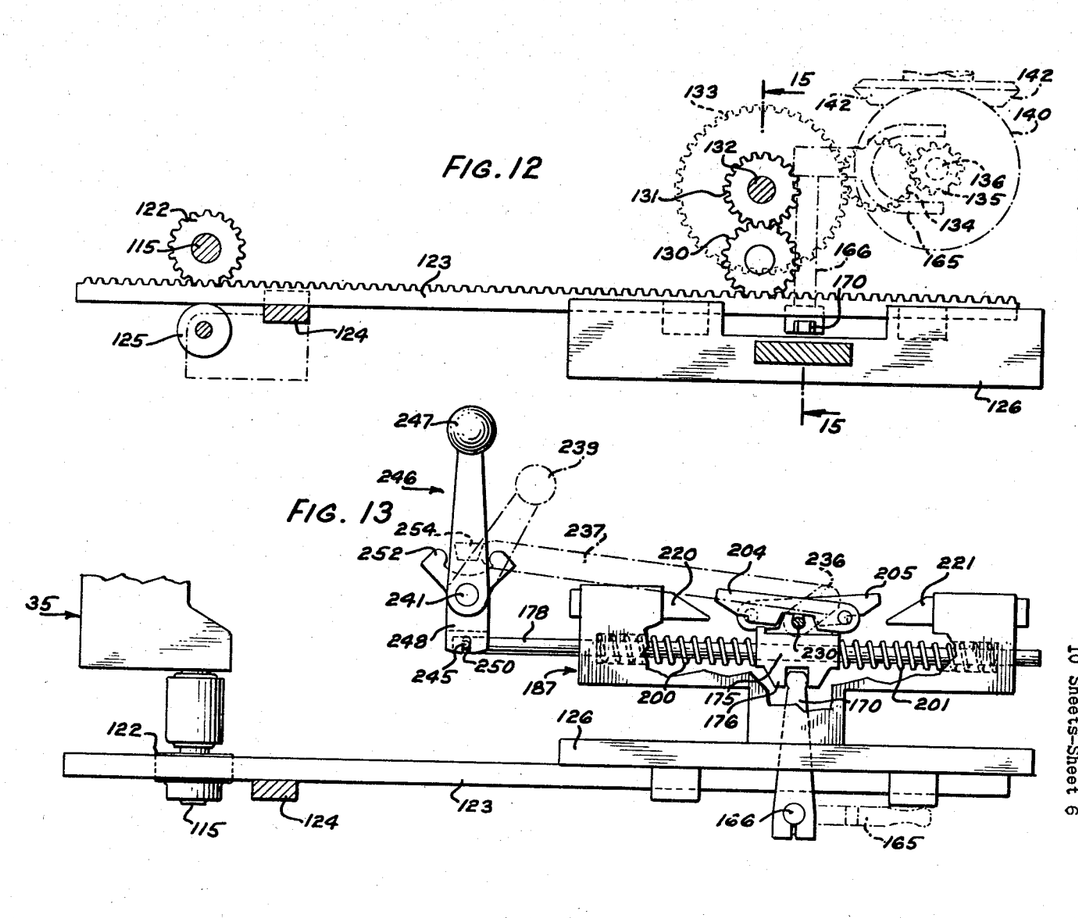
Fig. 12 is a diagrammatic plan view of a portion of the reversible drive mechanism for oscillating the core holder.
Fig. 13 is a diagrammatic vertical elevational view of a portion of the reversible drive mechanism for oscillating the holder and showing a portion of the adjustable control mechanism for effecting the rapid shifting of the reversible drive mechanism.
Figures 14, 15:
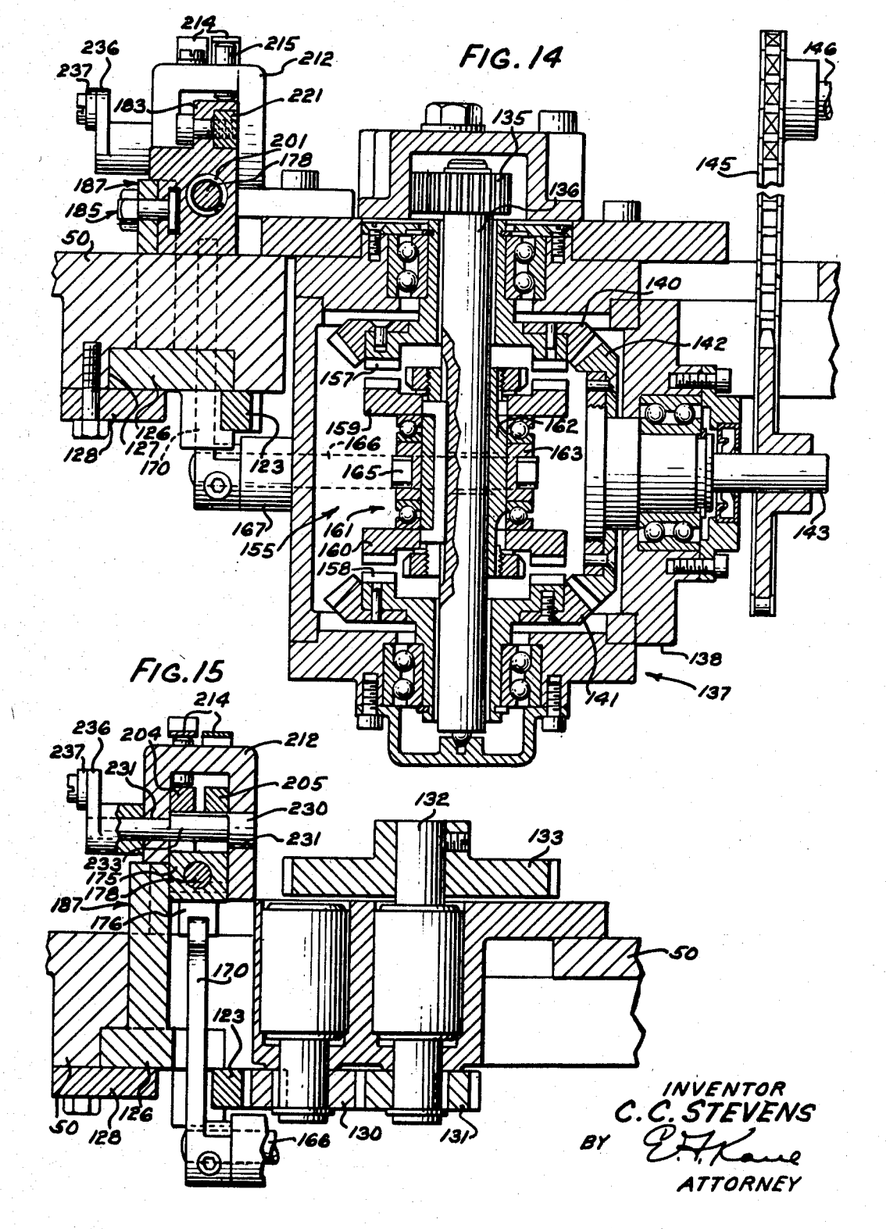
Fig. 14 is a vertical cross sectional view through a portion of the reversible drive mechanism taken on the line 14—14 of Fig. 2 and showing the reversible gear drive and the clutch associated therewith.
Fig. 15 is a fragmentary vertical cross sectional view taken on the line 15—15 of Figs. 2 and 12.

The drive for oscillating the core holder 35 comprises the rack bar 123 (Figs. 1, 12 and 13) which at one end thereof meshes with the gear 130 and is held in engagement therewith by a supporting bracket 124 and a roller 125 mounted on the base 50. At its other end the rack bar 123 is secured to a slide 126 guided for reciprocable movement in a slideway 127 (Fig. 14) in the base 50 and supported therein by a retaining plate 128. Also meshing with the rack 123 is a gear 130 (Figs. 12 and 15) which meshes with a gear 131 mounted on the lower end of a shaft 132 rotatably mounted in a bracket secured to the base 50 and having a gear 133 secured thereto at its upper end. An idler gear 134 meshes with the gear 133 and a gear 135 secured to the upper end of a vertically disposed shaft 136 (Figs. 2, 12 and 14) of a reversible gear driving unit 137 enclosed within a housing 138 secured to the base 50. The shaft 136 is rotatably mounted in the housing 138 and has freely rotatably mounted thereon on the opposite end portions thereof a pair of bevelled gears 140 and 141. The bevelled gears 140 and 141 mesh on opposite sides with a bevelled drive gear 142 secured to a shaft 143 and rotatably mounted in the housing 138. The shaft 143 is connected, through a sprocket and chain drive 145, to the output shaft 146 of a variable speed drive unit 148 (Fig. 2), the input shaft 149 of which is connected through a belt drive 150 to the end of the shaft 59 of the drive motor 60. The variable speed drive unit 148 is of a conventional or well-known kind, having a control handle 153 thereon by means of which the speed ratio may be varied between the input and output shafts 149 and 146, respectively.

A reversible clutch mechanism 155 is provided by means of which either one of the oppositely rotating bevel gears 140 and 141 may be selectively operatively connected to the shaft 136. Clutch members 157 and 158 are secured to the inner faces of the bevelled gears 140 and 141, respectively, and have inwardly projecting teeth adapted to engage with cooperating teeth on complementary clutch members 159 and 160, respectively, of the shiftable element 161 of the clutch. The clutch members 159 and 160 are fixedly mounted on opposite ends of a sleeve 162 which is splined on the shaft 136 and has a collar 163 rotatably secured thereto, which collar is provided with a pair of grooves to receive the bifurcated end of a shifting fork 165. The shifting fork 165 is secured at one end to a rod 166 pivotally mounted in a bearing member 167 secured to the housing 138 and secured thereto at its forward end the rod has an upwardly extending shift lever 170. From an inspection of Fig. 14, it will be seen that the bevelled gears 140 and 141 are freely rotated on the shaft 136 in opposite directions, that the shifting component 161 of the clutch is in the neutral position, and that by selectively moving the shift lever 170 in opposite directions, the shiftable element 161 of the clutch may be shifted into engagement with either the clutch components 157 or 158 to establish a driving connection between either of the bevel gears 157 and 158 and the shaft 136. Thus the lever 170 may be moved to a neutral position to disconnect the shaft 136 from the reversible drive or it may be selectively moved in opposite directions to cause the rotation of the shaft 136 in either direction.

The shift lever 170 is rocked about the axis of the shaft 166 to shift the clutch element 161 to and from its neutral and two operative positions by a shifting member or yoke 175 (Figs. 13, 15, 16, 17 and 19) having a pair of downwardly extending fingers 176—176 slidably engaging with the upper end of the shifter lever 170. The shifter member 175 (Fig. 17) is pinned to a slide rod 178 mounted for axial movement in bushings 179—179, threadedly engaging apertures 180—180 in a pair of blocks or brackets 182—183, disposed on opposite sides of the shifter member 175. The brackets 182 and 183 are adjustably mounted, as by means of a bolt and slot connection 185—186, to the opposite ends of a carriage or supporting member 187 (Fig. 16) secured to and movable with the slide 126. Helical compression springs 200—201 encircle the shift rod 178 on opposite sides of the shifter member 175.

Figure 16:
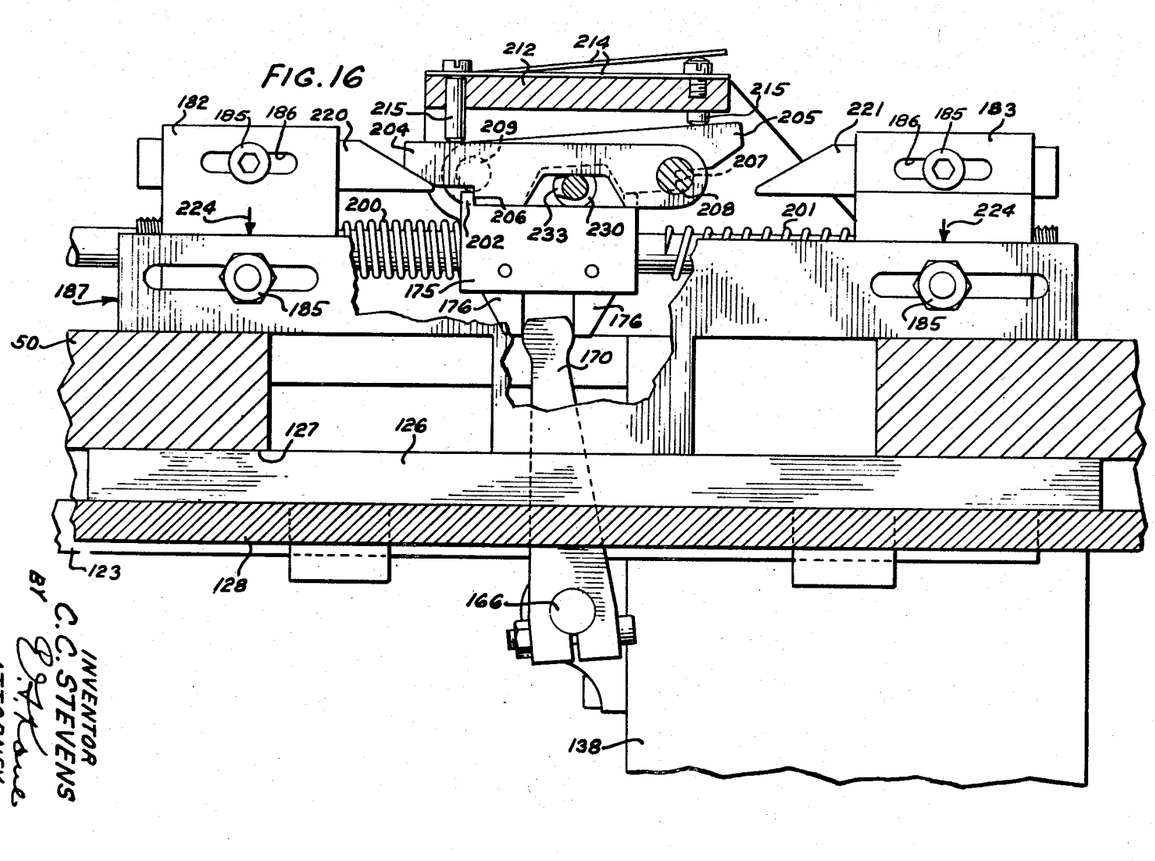
Fig. 16 is an enlarged fragmentary sectional view through the automatic clutch shifting mechanism showing the shifting member held in one of its operative positions by a locking pawl in engagement therewith.

The shifter 175 is adapted to be moved longitudinally between two operative positions to effect the shifting of the clutch element 161 and the reversal of the direction to drive to the core holder 35. Provided with stop lugs 202—203 (Figs. 18 and 19) on the opposite ends of the top surface thereof, the shifter 175 is adapted to be held in either of its operative positions by one or the other of a pair of holding pawls 204 and 205 (Figs. 16 and 17), having shoulders 206 and 207, respectively, engageable with the lugs 202 and 203. The holding pawls 204 and 205 are pivotally connected by pins 208 and 209, respectively, to opposite walls of a stationary bracket 212 secured to the base 50. The side walls of the bracket 212 (Figs. 14, 17 and 18) slidably engage the shifter 175 and prevent its turning about the axis of the rod 178. Leaf springs 214 secured at one end to the stationary bracket 212 and acting, through pins 215—215, serve to urge the holding pawls 204 and 205 downwardly into engagement with the shifter member 175. From the foregoing description it will be seen that with the shifter 175 in its left-hand operative position, as shown in Fig. 16, and with the rack 123, slide 126 and the carriage 187 being moved in a right-hand direction, the bracket 182 on the carriage serves to compress the spring 200 against the shifter 175 and to load the spring. The shifter 175 remains stationary until the holding pawl 204 is elevated, whereupon the spring 200 acts to instantly propel the shifter 175 to the right to its other operative position to effect the reversal of the drive. Upon the arrival of the shifter 175 to its right-hand operative position, the pawl 205 will fall into locking position in engagement with the lug 203 to lock the shifter 175 in its other operative position.

Cams or tripping dogs 220 and 221, adjustably secured to the brackets 182 and 183 of the reciprocable carriage 187, are positioned in alignment with the holding pawls 204 and 205, respectively. The cams 220 and 221 have inclined cam surfaces which are adapted to engage the free ends of the pawls 204 and 205, respectively, and lift them alternately out of locking engagement with the lugs 202 and 203 on the shifting member 175. By adjusting the position of the brackets 182 on the carriage 187 to vary the distance between the cams 220 and 221, the length of travel of the carriage 187 and the rack 125 may be varied to control the extent of rotation or oscillation of the holder 35. To facilitate the setting of the cams 220 and 221 on the carriage 187 to control the arc of traverse of the holder 35, the brackets 182 and 183 are provided with arrows or index lines 224—224 (Fig. 16) which may be aligned with predetermined calibrations 226—226 (Fig. 2) on the carriage 187. The shifter 175 and the elements associated therewith, that is, the compression springs 200 and 201, locking pawls 204 and 205, and the pawl lifting cams 220 and 221 adjustably mounted on the carriage 187 for movement with the rack bar 123, constitute a control mechanism for automatically shifting the drive reversing clutch 155 with a rapid or snap action to cause the substantially instantaneous reversal of rotation of the core holder 35.

In the operation of the reversing mechanism, assuming that the clutch is in one of its operative positions and locked therein by the cooperation of the locking pawl 204 and the shifter member 175 to establish a driving connection to rotate the core holder 35 in one direction and to move the carriage 187 to the right, as viewed in Fig. 16, it will be seen that as the carriage continues its movement to the right, the left-hand spring 200 will be compressed against the shifter 175 and that at a predetermined point in the movement of the carriage 187, the trip dog 220 will lift the locking pawl 204, and effect the release of the shifter 175 which will instantly be propelled by the spring 200 toward the right to cause the shifting of the clutch to its other operating position. The shifter member 175 as it is moved over to its right-hand operative position, is locked in this position by the engagement of the lug 203 thereon with the shoulder 207 on the locking pawl 205. With the shifting of the clutch to its right-hand operative position, the drive to the core holder is reversed and the carriage 187 moves to the left, as viewed in Fig. 16, resulting in the compression of the spring 201 against the shifter 175 in a left-hand direction until such time that the dog 221 actuates the locking pawl 205 and causes the instantaneous shifting of the shifter member 175 to its left-hand operative position, thereby causing the shifting to its other operative position of the clutch 155 and the reversal of the drive.

Figures 17, 18, 19:
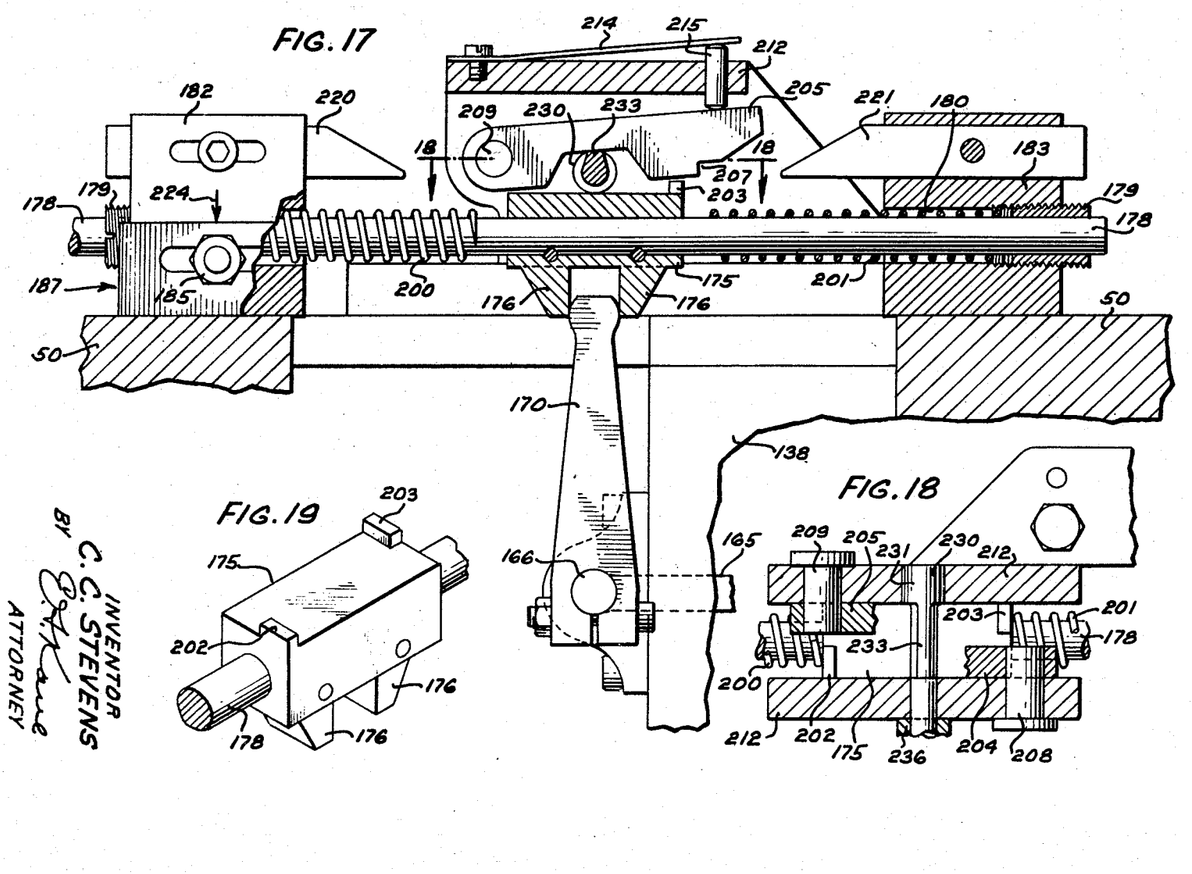
Fig. 17 is a fragmentary vertical sectional view through the clutch shifting mechanism in neutral position.
Fig. 18 is a fragmentary plan sectional view taken on the line 18—18 of Fig. 17 showing a portion of the locking pawls and the cam for rendering the locking pawls ineffective.
Fig. 19 is a perspective view of the clutch shifter.

Means are provided for disconnecting the control mechanism for effecting the automatic reversal of the drive in order to permit the manual operation of the shifting member 175. To this end, a cam shaft 230 is provided (Figs. 15, 16, 17 and 18), which cam shaft is disposed beneath the intermediate portions of the locking pawls 204—205 and is journalled in bearings 231—231 in the bracket 212. The cam shaft 230 is provided with a cam lobe 233 which, in its normal position, as shown in Fig. 16, permits the normal functioning of the locking pawls 204 and 205, but which when turned to its operative position, as indicated in Fig. 17, acts to cam the locking pawls 204 and 205 upwardly so as to render them ineffective to engage the lugs 202 and 203 on the shifter member 175. At its forward end, the cam shaft 230 has secured thereto a lever 236 (Figs. 1, 2 and 15) which at its free end is connected to one end of a connecting link 237, which at its other end is pivotally attached at 238 to a manually actuated cam operating lever 239. The lever 239 is freely mounted for pivotal movement on a supporting rod 241 (Fig. 20) which is secured in a supporting bracket 242 mounted on the base 50. Thus, by rocking the lever 239 about the rod 41, the cam 233 is rocked from its inoperative position, as shown in Fig. 16, to its operative position, as shown in Fig. 17, to render the automatic shifting mechanism inoperative and to render the shifter 175 free for manual operation.

Figure 20:
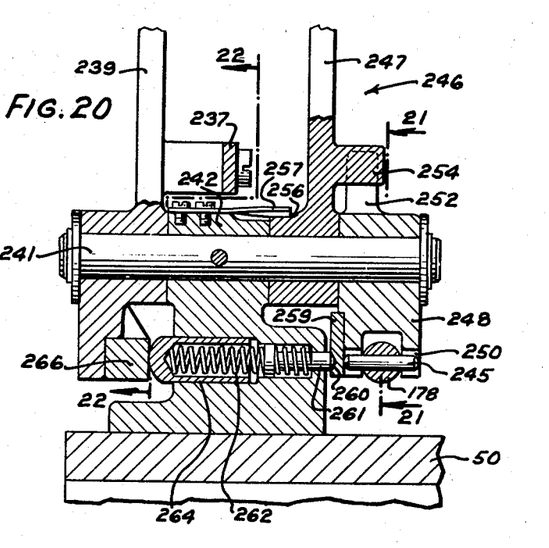
Fig. 20 is a fragmentary vertical sectional view taken on the line 20—20 of Fig. 1 showing portions of the manually operated cam and reversing levers.
Figure 21:
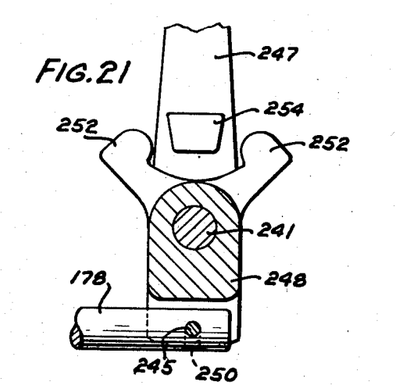
Fig. 21 is a fragmentary sectional elevational view taken on the line 21—21 of Fig. 20 showing a portion of the reversing lever.
Figure 22:
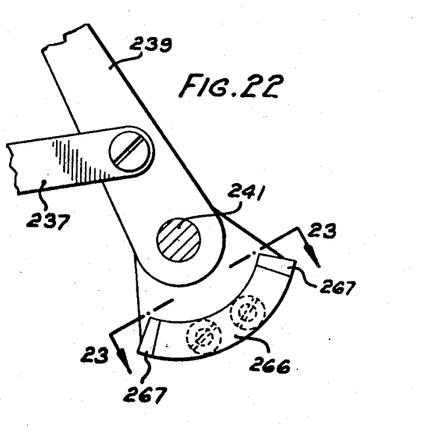
Fig. 22 is a detailed sectional elevational view taken on the line 22—22 of Fig. 20 and showing the manually operated cam lever.
Figure 23:
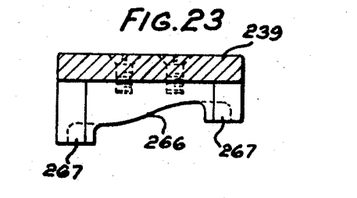
Fig. 23 is a detailed sectional view taken on the line 23—23 of Fig. 22.

To effect the manual operation of the shifter 175, the shift rod 178 at its left-hand end, as viewed in Fig. 1, is provided with a transversely extending pin 245 (Fig. 20) which is operatively connected to a jointed reversing lever 246. The jointed reversing lever 246 comprises an upper handle portion 247 and a lower lever portion 248, both freely mounted on the supporting rod 241. The lower lever 248 is provided with a bifurcated end for receiving the shift rod 178 and with radially extending slots 250 to receive the connecting pin 245 on the shift rod and has two upwardly extending diverging arms 252—252 (Fig. 21) straddling and engageable with a lug 254 extending laterally from the lever 247. The two-piece jointed construction of the reversing lever 246 and the lost motion connection between the arms 252 and the lugs 254 permits the reciprocation of the shift rod 178 and the oscillation of the lower lever 248 without imparting movement thereby to the handle portion 247 of the reversing lever. The hub of the handle portion 247 is provided with a recess or groove 256 into which the end of a flat spring detent 257 is urged to yieldably maintain the handle portion 247 of the reversing lever in upright position.

A plate 259 is secured to the lower portion of the lever 248 and is provided with a conical recess 260 into which a spring-pressed detent 261 is yieldably urged by a spring 262. The spring 262 is positioned in the recessed end of a cylindrical plunger or cam follower 264, slidingly mounted for reciprocation in a bore in the supporting bracket 242, and the end of the follower engages a cam 266 mounted on a downwardly extending portion of the cam lever 239. A pair of transversely projecting lugs 267—267 formed on the end of the cam 266 are engageable with the cam follower 264 and serve to limit the angular movement of the cam lever 239. The cam 266 is adapted, upon movement of the cam lever 239, to impart axial movement to the cylindrical cam follower 264 to vary the tension of the spring 262. The spring pressure applied to the detent 261, when the cam lever 239 is in its normal position, is relatively light, permitting free oscillation of the lower member 248 of the reversing lever, but the spring pressure on the detent is greatly increased when the cam lever 239 has been moved to its other position to rotate the cam 233 and effect the movement of the holding pawls 204 and 205 to their inoperative position. The detent 261, under the increased spring pressure, serves to yieldably hold the lower lever 248, the shifter rod 178 and the shifter in set positions. Thus when the cam lever 239 has been moved to the right, as viewed in Fig. 1, to render inoperative the controls for automatically reversing the drive, the handle 247 of the reversing lever 246 may be rocked to cause the lug 254 thereon to engage an arm 252 of the lever 248 and rotate it against the resistance of the detent 261 to impart movement to the shift rod 178 and thus manually move the shifter member 175 to its neutral or either of its operative positions.

It will thus be apparent that by the manual actuation of the cam lever 239, the automatic reversing mechanism may be rendered inoperative and, by the manual operation of the reversing lever 246, the drive may be disconnected from the core holder 35 or reconnected for movement in either direction to rotate the holder 35 to any angular position desired by the operator. This manual control is desirable inasmuch as it is essential to start the winding of the wire for each new coil in a predetermined starting position relative to the core on which the coil is wound.

A motor control 270 is provided (Fig. 2) having a control handle 271 movable to any of three positions to effect the rotation of the motor 60 in a forward or reverse direction or to bring it to a stop. Thus after a core 30 has been clamped in position and interlinked with the shuttle 40, the control lever 271 is moved to cause the motor 60 and the shuttle 40 to be rotated in a reverse direction to wind the predetermined length of strand onto the shuttle, upon completion of which the lever 271 is moved to cause the motor to stop while the end of the strand is manually secured to the core, after which the control lever 271 is moved to forward position to cause the motor and the shuttle to rotate in a forward direction to wind the strand onto the core 30. It will be understood that while the motor 60 is rotating in a reverse direction, the drive mechanism may be disconnected from the core holder 35 by the manual actuation of the cam lever 239 and the reversing lever 246.

From the foregoing description, it will be apparent that the machine is adapted to wind strand on toroidal cores through various arcuate portions thereof and with various spacing of the strand. Thus by properly setting the cams or tripping dogs 220 and 221 on the carrier 187, the arcuate traverse of the core holder may be controlled to permit the winding of strand on segments of the core of various arcuate lengths within the limits of the machine, for example, from 60° to 180°. By the provision of the variable speed drive, the rate of rotation of the shuttle to that of the core holder may be varied thus permitting the strand to be laid or wound on the core in either tight or loose spacing.

In order to permit the winding of cores of various sizes, parts of the machine are adjustable and provision is made for the removal of the shuttle 40 and the head 49 and the substitution thereof of a shuttle and head of a different size. The head 49, including the shuttle 40 and the drive therefor, may be readily removed by unscrewing cap screws 275 (Fig. 3) by means of which the head is secured to the base 50, and a head 49 of a different size secured in the same position on the base on the machine by the same cap screws 275. When changing the head 49 and the shuttle 40 to a different size, the core holder 35 may be adjusted longitudinally of the base by the unscrewing of the retaining screws 118 (Fig. 10) and adjusting the supporting bracket 117 to properly position the core holder 35 relative to the shuttle, after which the screws 118 may again be tightened. In like manner the bracket 72 (Fig. 5) may be adjusted longitudinally on the base by removing the screws 75, moving the bracket to the proper position and replacing the screws 75. The tensioning device 84 may be adjusted longitudinally relative to the shuttle by turning the adjusting screw 90 (Fig. 5). By removing the cap screws 277 (Figs. 1 and 5) from the support 71 and the bracket 72, the support 71 and the lever 64 may be adjusted to the proper elevation to accommodate the shuttle of different size and the screws 177 may then be re-screwed into other tapped holes in the bracket 72 provided therefor.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A toroidal core winding machine comprising a holder for holding a core, a shuttle, drive means for rotating said shuttle at a constant speed, means mounting said holder for oscillation about an axis to distribute the winding on the core, gearing means operatively connected to said holder for automatically oscillating said holder, control means operable in response to the actuation of said gearing means and settable for controlling the extent of oscillation of said holder, motor means for driving said gearing means at a constant speed, and means for changing the speed at which said gearing means is driven.

2. A toroidal core winding machine comprising a shuttle, means for rotating the shuttle, a holder for holding a core in operative position relative to said shuttle, means mounting said holder for oscillation about an axis to distribute the winding on the core, drive means including gearing operatively connected to said holder for oscillating said holder, said gearing including clutch means having a normal neutral position and two operative positions, control means operable in response to the movement of said gearing in opposite directions for automatically shifting said clutch from one to the other of said operative positions, means for disconnecting said control means from said clutch to permit the setting of the core holder, and manual means for actuating said clutch.

3. A toroidal coil winding machine comprising a base, a shuttle, means on said base for supporting said shuttle for rotation, drive means including a motor for rotating said shuttle, a core holder for holding a core in position to be wound from said shuttle, means including a shaft mounting said core holder for movement on said base about an axis substantially tangent to said shuttle to distribute the winding on the core, a gear mounted on said shaft, a reciprocable rack bar meshing with said gear for imparting oscillation thereto, reversible drive means operatively connected to said motor and having a reversible gear operatively connected to said rack bar for imparting reciprocating movement thereto, said reversible drive means including a clutch having a normal neutral position for disconnecting the drive to said holder and two operative positions to effect the movement of said core holder in opposite direction, a clutch shifter having a shifter rod and being movable from a neutral position to two operative positions and operable to move said clutch from said neutral position to either of said operative positions, springs on said shifter rod on opposite sides of said shifter, a carriage reciprocable with said rack bar and having members thereon engageable with the ends of said springs and operable in response ot reciprocation of said carriage to compress alternate springs against said shifter to stress said shifter for movement in opposite directions to its operative positions, a pair of holding pawls operable to hold said shifter in opposite operative positions, a pair of cams on said carriage alternately engageable with said pawls in response to predetermined travel of said carriage to disconnect said pawls from said shifter to effect a rapid movement of said shifter from one operative position to the other under the influence of said springs, and means for adjusting the position of said cams on said carriage to vary the length of travel of said carriage and said rack bar to control the angular traverse of said core holder.

4. A toroidal coil winding machine comprising a base, a shuttle, means on said base for supporting said shuttle for rotation, drive means including a motor for rotating said shuttle, a core holder for holding a core in position to be wound from said shuttle, means including a shaft mounting said core holder for rotation on said base about an axis substantially tangent to said shuttle, a gear mounted on said shaft, a reciprocable rack bar meshing with said gear for imparting oscillation thereto, drive means operatively connected to said motor and having a gear operatively connected to said rack bar for imparting reciprocating movement thereto, said drive means including a clutch having a normal neutral position for disconnecting the drive to said holder and two operative positions to effect the movement of said core holder in opposite directions, a clutch shifter having a shifter rod and being movable from a neutral position to two operative positions and operable to move said clutch from said neutral position to either of said operative positions, springs on said shifter rod on opposite sides of said shifter, a carriage reciprocable with said rack bar and having members thereon engageable with the ends of said springs and operable in response to reciprocation of said carriage to compress alternate springs against said shifter to stress said shifter for movement in opposite directions to its operative positions, a pair of holding pawls operable to hold said shifter in opposite operative positions, a pair of cams on said carriage alternately engageable with said pawls in response to predetermined travel of said carriage to disconnect said pawls from said shifter to effect a rapid movement of said shifter from one operative position to the other under the influence of said springs, means for adjusting the position of said cams on said carriage to vary the length of travel of said carriage and said rack bar to control the angular traverse of said core holder, manually operated means for disconnecting said holding pawls from said shifter, and manually operated means for shifting said shifter.

5. A toroidal coil winding machine comprising a base, a shuttle, means on said base for supporting said shuttle for rotation, drive means including a motor for rotating said shuttle at a uniform speed, a core holder for holding a core in operative position relative to said shuttle, means mounting said core holder for rotation on said base about an axis substantially tangent to said shuttle to distribute the winding on the core, a gear mounted on said holder, a reciprocable rack bar meshing with said gear for imparting oscillation thereto, reversible gearing operatively connected to said rack bar for imparting reciprocable movement thereto, a variable speed unit having an input shaft operatively connected to said motor and an output shaft operatively connected to said reversible gearing operable for varying the speed of oscillation of said core holder, said reversible gearing including a clutch having a neutral position for disconnecting the drive to said holder and two operative positions to effect the movement of said core holder in opposite directions, a clutch shifter having a shifter rod and being movable from a neutral position to two operative positions for moving said clutch from said neutral position to either of said operative positions, springs on said shifter rod on opposite sides of and engageable with said shifter, a carriage connected to said rack bar for movement therewith having shoulders engageable with the ends of said springs and operable in response to reciprocation of said rack bar to compress alternate springs against said shifter to stress said shifter for movement in opposite directions to its operative positions, a pair of holding pawls operable to hold said shifter in opposite operative positions, a pair of cams on said carriage alternately engageable with alternate pawls in response to a predetermined travel of said carriage to disengage said pawls from said shifter to effect a rapid movement of said shifter from one operative position to the other under the influence of said spring, and means for adjusting the position of said cams on said carriage to vary the length of travel of said carriage and to control the angular traverse of said core holder.

6. A toroidal coil winding machine comprisng a base, a shuttle, means on said base for supporting said shuttle for rotation, drive means including a motor for rotating said shuttle at a uniform speed, a core holder for holding a core in operative position relative to said shuttle, means mounting said core holder for rotation on said base about an axis substantially tangent to said shuttle to distribute the winding on the core, a gear on said holder, a reciprocable rack bar meshing with said gear for imparting oscillation thereto, reversible gearing operatively connected to said rack bar for imparting reciprocable movement thereto, a variable speed unit having an input shaft operatively connected to said motor and an output shaft operatively connected to said reversible gearing operable for varying the speed of oscillation of said core holder, said reversible gearing including a clutch having a neutral position for disconnecting the drive to said holder and two operative positions to effect the movement of said core holder in opposite directions, a clutch shifter having a shifter rod and being movable from a neutral position to two operative positions for moving said clutch from said neutral position to either of said operative positions, springs on said shifter rod on opposite sides of and engageable with said shifter, a carriage connected to said rack bar for movement therewith having shoulders engageable with the ends of said springs and operable in response to reciprocation of said rack bar to compress alternate springs against said shifter to stress said shifter for movement in opposite directions to its operative positions, a pair of holding pawls operable to hold said shifter in opposite operative positions, a pair of cams on said carriage alternately engageable with alternate pawls in response to a predetermined travel of said carriage to disengage said pawls from said shifter to effect a rapid movement of said shifter from one operative position to the other under the influence of said spring, means for adjusting the position of said cams on said carriage to vary the length of travel of said carriage and to control the angular traverse of said core holder, manually operated means for disconnecting said holding pawls from said shifter, and manually operated means for shifting said shifter.

7. A toroidal coil winding machine comprising a base, an annular shuttle, means on said base for supporting said shuttle for rotation, drive means including a motor for rotating said shuttle at a uniform speed, a core holder for holding a core in position to be wound from said shuttle, means mounting said core holder for rotation on said base about an axis substantially tangent to said shuttle to distribute the winding on the core, drive means interconnecting said holder and said motor for oscillating said holder comprising gearing including a reciprocable element and a clutch, said clutch having a normal neutral position and two operative positions and being operable in its neutral position to disconnect the drive to said holder and operable in its opposite operative positions to effect the movement of said holder in opposite directions, a clutch shifter, means mounting said shifter for movement from a neutral to either of two operative positions to effect the movement of the clutch from its neutral to either of its operative positions, a carriage mounted for movement with said reciprocable element of said gearing, spring means movable with said carriage disposed on opposite sides of and engageable with said shifter for stressing said shifter alternately for movement in opposite directions, a pair of locking pawls alternately operable for holding said shifter in its opposite operative positions, a pair of cam elements on said carriage alternately engageable with said pawls and operable to release said pawls from said shifter to cause the movement of said shifter from one operative position to the other under the influence of said spring means to effect the reversal of rotation of said core holder, and means for adjusting the position of said cam elements on said carriage to vary the angular traverse of said core holder.

8. A toroidal coil winding machine comprising a base, an annular shuttle, means on said base for supporting said shuttle for rotation, drive means including a motor for rotating said shuttle at a uniform speed, a core holder for holding a core in operative position relative to said shuttle, means mounting said core holder for rotation on said base about an axis substantially tangent to said shuttle to distribute the winding on the core, drive means interconnecting said holder and said motor for oscillating said holder comprising gearing including a reciprocable element and a clutch, said clutch having a normal neutral position and two operative positions and being operable in its neutral position to disconnect the drive to said holder and operable in its opposite operative positions to effect the movement of said holder in opposite directions, a clutch shifter, means mounting said shifter for movement from a neutral to either of two operative positions to effect the movement of the clutch from its neutral to either of its operative positions, a carriage mounted for movement with said reciprocable element of said gearing, spring means movable with said carriage disposed on opposite sides of and engageable with said shifter for stressing said shifter alternately for movement in opposite directions, a pair of locking pawls alternately operable for holding said shifter in its opposite operative positions, a pair of cam elements on said carriage alternately engageable with said pawls and operable to release said pawls from said shifter to cause the movement of said shifter from one operative position to the other under the influence of said spring means to effect the reversal of rotation of said core holder, means for adjusting the position of said cam elements on said carriage to vary the angular traverse of said core holder, means for manually disconnecting said holding pawls from said shifter, and means for manually shifting said shifter.

9. A toroidal core winding machine comprising a shuttle, means for rotatably supporting the shuttle, a holder for holding a core in position to be wound from said shuttle, means for mounting said holder for oscillation about an axis to distribute the winding on the core, drive means for rotating said shuttle and oscillating said core holder in timed relation to each other, means interposed between said drive means and said core holder to vary the speed of oscillation of said core holder relative to the speed of rotation of said shuttle, means for varying the angular traverse of said holder, and means for disconnecting said drive from said core holder to permit manual setting of the core holder.

10. A toroidal core winding machine comprising a shuttle, means for rotatably supporting the shuttle, a holder for holding a core in position to be wound from said shuttle, means for mounting said holder for oscillation about an axis to distribute the winding on the core, drive means for actuating said shuttle and said holder in timed relation to each other including means for reversing the movement of said holder, means for automatically actuating said reversing means, said actuating means being adjustable to vary the extent of the oscillation of said holder, means for rendering said actuating means inoperative and for disconnecting the drive means from said holder, and means for manually connecting the drive means to said holder to permit setting of the core holder.

11. A toroidal core winding machine comprising a shuttle, means for rotatably supporting the shuttle, a holder for holding a core in position to be wound from said shuttle, means for mounting said holder for oscillation about an axis to distribute the winding on the core, drive means for actuating said shuttle and said holder including means for reversing the movement of said holder, means for automatically actuating said reversing means, said actuating means being adjustable to vary the extent of the oscillation of said holder, means for rendering said actuating means inoperative and for disconnecting the drive means from said holder, manually operated means for connecting the drive means to said holder to permit setting of the core holder, and means interposed between said drive means and said core holder to vary the speed of oscillation of said core holder relative to the speed of rotation of said shuttle.

12. A toroidal core winding machine comprising a shuttle, means for rotating the shuttle at a uniform speed, a core holder for holding a core in winding position relative to said shuttle, means mounting said holder for oscillation about an axis, a pinion on said holder, a rack meshing with said pinion, drive means for reciprocating said rack through a predetermined stroke to oscillate said holder, snap action means for reversing the drive means for said rack at the end of each stroke of said rack, and adjustable means movable with said rack and settable to actuate said snap action means for varying the length of stroke of reciprocation of said rack.

13. A toroidal winding machine comprising a shuttle, means for rotating the shuttle at a uniform speed, a core holder for holding a core in operative position relative to said shuttle, means mounting said holder for oscillation about an axis to distribute the windings on the core, a pinion and rack for oscillating said holder, drive means for reciprocating said rack to oscillate said holder, snap action means for reversing said rack at the end of each stroke, said snap action means being adjustable for varying the length of stroke of said rack, and means for varying the linear speed of said rack while maintaining said uniform shuttle speed.

14. A toroidal winding machine comprising a shuttle, means for rotating the shuttle at a uniform speed, a core holder for holding a core in operative position relative to said shuttle, means mounting said holder for oscillation about an axis to distribute the winding on the core, a pinion and rack for oscillating said holder, drive means for reciprocating said rack to oscillate said holder including a clutch having a neutral position for disconnecting the drive to the holder and two operative positions for effecting the movement of the holder in opposite directions, snap action means for automatically shifting the clutch from one to the other of the operative positions at the end of each stroke of the rack, said snap action means being adjustable to vary the length of stroke of reciprocation of the rack, and means for varying the linear speed of said rack while maintaining said uniform shuttle speed.

15. A toroidal winding machine comprising a shuttle, means for rotating the shuttle at a uniform speed, a core holder for holding a core in position to be wound from said shuttle, means mounting said holder for oscillation about an axis, a pinion and rack for oscillating said holder, drive means including a clutch for reciprocating said rack through a predetermined stroke to oscillate said holder, snap action means for actuating said clutch to reverse said rack at the end of each stroke, means for adjusting said snap action means to vary the length of stroke of reciprocation of said rack, means for varying the linear speed of said rack while maintaining said uniform shuttle speed, manually operable means for rendering said snap action means inoperative and to actuate said clutch to neutral position, and means for manually actuating said clutch.

16. A toroidal coil winding machine comprising a shuttle, drive means for rotating said shuttle, a holder for supporting a core in a position to be wound from said shuttle, means mounting said core holder for oscillation about an axis to distribute the winding on the core, drive means for oscillating said holder including a reciprocable element and a clutch, said clutch having a normal neutral position and two operative positions and being operable in its neutral position to disconnect the drive from said holder and operable in its operative positions to effect the movement of said holder in opposite directions, means movable with said reciprocable element for stressing said clutch for movement alternately in opposite directions, means for latching said clutch in either operative position, means for tripping said latching means to effect the actuation of said clutch alternately from one to the other of said operative positions, and means for varying the position of said tripping means to vary the extent of oscillation of said holder.

17. A toroidal coil winding machine comprising a shuttle, drive means for rotating said shuttle, a holder for supporting a core in a position to be wound from said shuttle, means mounting said core holder for oscillation about an axis to distribute the winding on the core, drive means for oscillating said holder including a reciprocable element and a clutch, said clutch having two operative positions and being operable in said positions to effect the movement of said holder in opposite directions, means including resilient means movable with said reciprocable element for stressing said clutch for movement alternately in opposite directions, means for latching said clutch alternately in either operative position, means including a pair of trip elements movable with said reciprocable element for alternately actuating said latching means to effect the shifting of said clutch and the reversal of movement of said core holder, and means for adjusting the position of said trip elements to control the extent of oscillation of said core holder.

18. A toroidal coil winding machine comprising a shuttle, drive means for rotating said shuttle, a holder for supporting a core in a position to be wound from said shuttle, means mounting said core holder for oscillation to distribute the winding on the core, drive means for oscillating said holder including a reciprocable element and a clutch, said clutch having a normal neutral position and two operative positions and being operable in its neutral position to disconnect the drive from said holder and operable in its operative positions to effect the movement of said holder in opposite directions, means including spring means movable with said reciprocable element for stressing said clutch for movement alternately in opposite directions, means for latching said clutch alternately in either operative position, means including a pair of trip elements movable with said reciprocable element for alternately actuating said latching means to effect the shifting of said clutch and the reversal of movement of said core holder, means for adjusting the position of said trip elements to control the extent of angular traverse of said core holder, manually operated means for simultaneously actuating said trip elements to restore said clutch to neutral position, and means for manually shifting said clutch.

CLARENCE C. STEVENS.

References Cited in the file of this patent

UNITED STATES PATENTS

| Number | Name | Date |
|---|---|---|
| 697,660 | Pupin et al. | Apr. 15, 1902 |
| 1,053,962 | Alexander | Feb. 25, 1913 |
| 1,535,036 | Potter | Apr. 21, 1925 |
| 2,444,126 | Wirth | June 29, 1948 |